United States Patent [19]  
Day

[11] 3,768,059  
[45] Oct. 23, 1973

[54] AMBIENT COMPENSATED SOLAR SENSOR
[75] Inventor: Donald W. Day, Harlem, Winnebago County, Ill.
[73] Assignee: Barber-Colman Company, Rockford, Ill.
[22] Filed: May 15, 1972
[21] Appl. No.: 253,413

[52] U.S. Cl................ 338/25, 73/362 AR, 236/91
[51] Int. Cl.............................................. H01c 7/00
[58] Field of Search ...................... 338/7, 9, 24, 25; 73/339 C, 355 R, 362 AR, 342, 170 R; 236/91; 340/227, 233, 285; 250/83.3 H

[56] References Cited
UNITED STATES PATENTS
3,619,614  11/1971  Yamaka.......................... 250/83.3 H
2,766,619  10/1956  Tribus et al....................... 338/25 X
3,355,589  11/1967  Clifford............................ 73/355 X Primary Examiner—C. L. Albritton  
Attorney—A. Richard Koch

[57] ABSTRACT

A sensor of solar radiation comprises a pair of matched temperature sensors in fixed thermally insulated relation one to another, one of the pair being exposed to solar radiation and the other shielded from solar radiation.

9 Claims, 2 Drawing Figures

PATENTED OCT 23 1973

3,768,059

AMBIENT COMPENSATED SOLAR SENSOR

BACKGROUND OF THE INVENTION

This invention relates to solar thermal radiation sensors for use in automatic temperature regulation.

In a building having a central heating and cooling system, the amount of heating or cooling required to maintain a constant predetermined temperature in different peripheral zones varies with the position of the sun and the intensity of the solar radiation. For many years the solar radiation received by a sensor located to detect the radiation affecting predetermined zones has been used to modify the amount of heating or cooling delivered to such zones. In many installations solar radiation was measured without compensation for ambient temperature. Such installations were unsatisfactory. Other installations used two separate sensors - one exposed to solar radiation and one shielded from it. Such installations were also unsatisfactory, because the sensors had to be separately mounted, had different characteristics and presented difficult problems in calibration.

SUMMARY OF THE INVENTION

According to this invention the sensors are mounted at the same time, have matching characteristics and require no calibration. The assembly is simple and inexpensive.

DESCRIPTION OF THE PREFERRED EMBODIMENT

Figure 1:
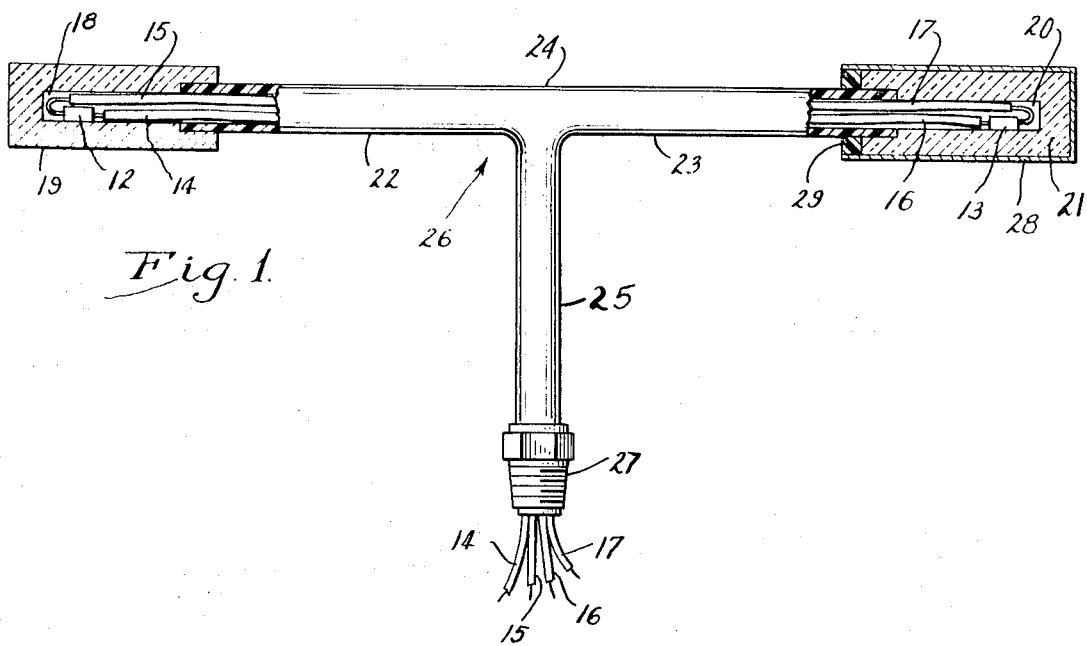
FIG. 1 is a view of the ambient compensated solar sensor partially in section.
Figure 2:
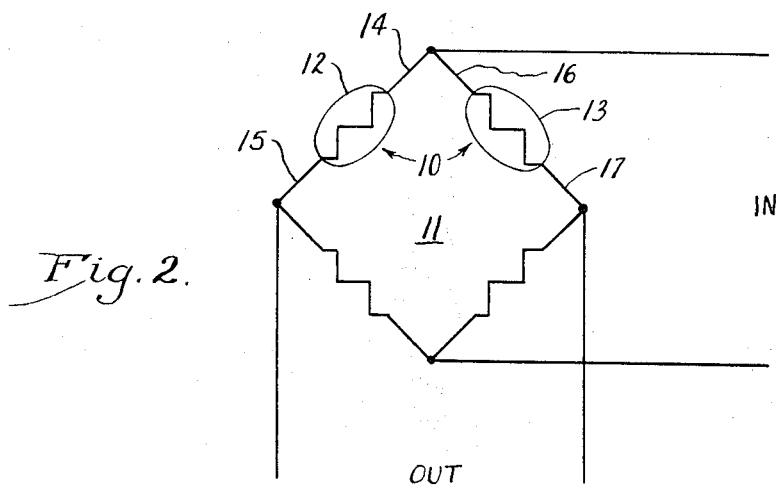
FIG. 2 is a schematic circuit showing how the ambient compensated solar sensor may be connected into an external bridge circuit.

As shown in the drawing the ambient compensated solar sensor 10 is connected, in demonstrating its use, to a comparison device, shown as a bridge 11, the output of which may be employed to control a valve or damper (not shown).

The compensated solar sensor 10 comprises a pair of matched thermal sensors, such as resistances, 12, 13 connected through insulated leads 14, 15, 16, 17 as adjacent arms of the bridge 11, the output from which varies in accordance with relative changes in temperature of the resistances. The solar sensitive resistance 12 is embedded as by a thermally conductive potting compound 18 in a transparent enclosure 19. The enclosure is preferably cylindrical and closed at one end with the resistance 12 located on the axis of the cylinder so that the path of solar rays through the enclosure 19 and potting compound 18 to resistance 12 is constant as the sun moves around the axis. The cylindrical shape also tends to focus the suns rays on the resistance 12. The potting compound is preferably black to absorb the heat. The ambient compensating resistance 13 is similarly embedded by potting compound 20 in a similar enclosure 21. The enclosures 19, 21 are mounted in fixed spaced relation on respective opposite ends 22, 23 of a tubular insulating pipe or conduit 24 of sufficient length to prevent heat transfer between the resistances 12, 13. Another pipe or conduit 25 is joined perpendicularly to the midpoint of insulating conduit 24 to form a tee 26, the ends 22, 23 providing the crossbar 24 and the perpendicular conduit 25, terminating in a pipe fitting 27 or other mounting means, serving as the sole support of the compensated sensor 10. The leads 14, 15 from solar resistance 12 pass through end 22 and support 25 to bridge 11. Leads 16, 17 from ambient resistance 13 pass through end 23 and support 25 to the bridge 11. The leads 14, 15, 16, 17 are all therefore of substantially the same length and resistance. An opaque shield, shown as a cup 28 closely fitting around enclosure 21 and a coating 29 between the cup 28 and end 23, protects the ambient resistance 13 from solar radiation. The shield is preferably also reflective and resistant to atmospheric corrosion.

Both sensors 12, 13 are subjected to substantially the same ambient temperature, and, being matched in characteristics, produce the same resistance in the absence of radiant energy from the sun regardless of ambient temperature. When solar energy is present, it passes through the transparent enclosure 19 and is absorbed by potting compound 18 to raise the temperature of solar sensor 12, while it is reflected by the cup 28 and so prevented from raising the temperature measured by ambient sensor 13. Since the resistances of the sensors 12 and 13 depend upon the temperatures of the sensors, the resistances will be different. Because of the different resistances in the arms of bridge 11, the output of the bridge will be changed to reposition the valve or damper.

While the sensors 12, 13 have been described as thermal sensitive resistances, they could be thermal current generators or other thermoelectrical transducers. Although the enclosures 19, 21 and tee 26 are preferably made of plastic that may be easily cemented together, other materials such as glass and fibre may also be employed.

I claim

1. An ambient compensated solar sensor comprising a support, a pair of matched thermal sensors mounted on said support in fixed widely spaced thermally insulated relation to substantially prevent heat transfer between said thermal sensors, and a shield surrounding and protecting from solar radiation one of the matched thermal sensors, the other of said matched thermal sensors being unshielded.

2. A solar sensor according to claim 1 additionally comprising transparent enclosures for each of said thermal sensors, said enclosures being substantially identical.

3. A solar sensor according to claim 2 wherein a thermally conductive potting compound embeds said thermal sensors within the respective enclosures.

4. A solar sensor according to claim 1 further comprising an insulating member, said thermal sensors mounted on opposite ends of said insulating member, and said support joined to the insulating member.

5. A solar sensor according to claim 4 wherein said insulating member and said support form a tee.

6. A solar sensor according to claim 5 wherein said tee is made of plastics.

7. A solar sensor according to claim 5 wherein said tee comprises tubular construction.

8. A solar sensor according to claim 7 additionally comprising leads connected to the respective thermal sensors and passing through said tee for connection to an external circuit.

9. A solar sensor according to claim 1 wherein said thermal sensors are thermal sensitive resistances.

* * * * *